US012812136B2

(12) United States Patent
Lee

(10) Patent No.: US 12,812,136 B2
(45) Date of Patent: Nov. 24, 2026

(54) IMAGE PROCESSING DEVICE AND IMAGE PROCESSING METHOD

(71) Applicant: REALTEK SEMICONDUCTOR CORPORATION, Hsinchu (TW)

(72) Inventor: Cheng-Hao Lee, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 105 days.

(21) Appl. No.: 18/528,834

(22) Filed: Dec. 5, 2023

(65) Prior Publication Data

US 2024/0195989 A1 Jun. 13, 2024

(30) Foreign Application Priority Data

Dec. 9, 2022 (TW) ................................. 111147373

(51) Int. Cl.
*H04N 19/59* (2014.01)
*G06T 5/50* (2006.01)
*H04N 19/184* (2014.01)

(52) U.S. Cl.
CPC ............. *H04N 19/184* (2014.11); *G06T 5/50* (2013.01); *H04N 19/59* (2014.11); *G06T 2207/20221* (2013.01)

(58) Field of Classification Search
None
See application file for complete search history.

(56) References Cited

U.S. PATENT DOCUMENTS 10,021,366 B2 7/2018 Lu
2007/0285500 A1* 12/2007 Ma ........................ H04N 19/105 375/E7.149
2018/0091821 A1* 3/2018 Jeon ..................... H04N 19/187
2022/0109838 A1* 4/2022 Guruva reddiar ..... H04N 19/46
2025/0071333 A1* 2/2025 Laroche ................. H04N 19/70

FOREIGN PATENT DOCUMENTS

TW 2015/43414 A 11/2015

OTHER PUBLICATIONS

1) OA letter of a counterpart TW application (appl. No. 111147373) mailed on Aug. 16, 2023. Summary of the TWOA letter in regard to the TW counterpart application: (1) Claim(s) 1-2 and 7-10 is/are rejected under Patent Law Article 22 (2) as allegedly being unpatentable over reference 1 (US 2018/0091821 A1) and reference 2 (TW 2015/43414 A). Claim correspondence between the TW counterpart application and the instant US application: Claims 1-10 in the TW counterpart application correspond to claims 1-10 in the instant US application, respectively.

* cited by examiner

*Primary Examiner* — Samuel D Fereja
(74) *Attorney, Agent, or Firm* — WPAT, PC

(57) ABSTRACT

An image processing device and an image processing method are used for processing a video data that includes a first bitstream and a second bitstream. The image processing method includes the following steps: decoding the first bitstream to generate a first frame; generating an intermediate image based on at least the first frame; and mixing the intermediate image and a buffered image according to a reference data to generate a pre-mixed image. The buffered image includes a second frame and a third frame which correspond to the second bitstream and the first bitstream, respectively.

14 Claims, 8 Drawing Sheets

IMAGE PROCESSING DEVICE AND IMAGE PROCESSING METHOD

BACKGROUND OF THE INVENTION

1. Field of the Invention

The present invention generally relates to image processing, and, more particularly, to an image processing device and an image processing method for processing multiple bitstreams.

2. Description of Related Art

FIG. 1 is a functional block diagram of a conventional electronic device. The electronic device 100 includes a decoding circuit 110 and a scaling circuit 120. When the electronic device 100 processes a bitstream BSM, the decoding circuit 110 first decodes the bitstream BSM, and then the scaling circuit 120 performs a scaling operation on the decoded frame to generate an output image IM_out. In some applications, when an electronic device needs to simultaneously process N bitstreams and simultaneously display N frames of the N bitstreams (N>1), the electronic device must use N decoding circuits 110 and N scaling circuits 120 to process the N bitstreams, respectively, which increases the cost and decreases the competitiveness. Other prior art technologies rely on time division multiplex (TDM) to use the same decoding circuit 110 and scaling circuit 120 to process multiple bitstreams, but TDM limits the time that the decoding circuit 110 and the scaling circuit 120 can use to process each bitstream. As a result, the decoding circuit 110 and the scaling circuit 120 must increase the operating frequency, which inevitably increases the circuit cost and power consumption.

SUMMARY OF THE INVENTION

In view of the issues of the prior art, an object of the present invention is to provide an image processing device and an image processing method, so as to make an improvement to the prior art.

According to one aspect of the present invention, an image processing device is provided. The image processing device is coupled to a storage circuit and configured to receive a video data that includes a first bitstream and a second bitstream. The image processing device includes a decoding circuit, a computing circuit, a frame composer, and an image pre-mixer. The decoding circuit is configured to decode the first bitstream to generate a first frame. The computing circuit is coupled to the decoding circuit and configured to generate a reference data. The frame composer is coupled to the decoding circuit and configured to generate an intermediate image based on at least the first frame and to store the intermediate image in the storage circuit. The image pre-mixer is coupled to the storage circuit and configured to mix the intermediate image and a buffered image according to the reference data to generate a pre-mixed image. The buffered image includes a second frame corresponding to the second bitstream.

According to another aspect of the present invention, an image processing method is provided. The image processing method processes a video data that includes a first bitstream and a second bitstream. The image processing method includes the following steps: decoding the first bitstream to generate a first frame; generating an intermediate image based on at least the first frame; and mixing the intermediate image and a buffered image according to a reference data to generate a pre-mixed image. The buffered image includes a second frame and a third frame. The second frame corresponds to the second bitstream. The third frame corresponds to the first bitstream.

The technical means embodied in the embodiments of the present invention can solve at least one of the problems of the prior art. Therefore, compared to the prior art, the present invention can reduce the cost and power consumption of the circuit.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an image processing device and an image processing method. On account of that some or all elements of the image processing device could be known, the detail of such elements is omitted provided that such detail has little to do with the features of this disclosure, and that this omission nowhere dissatisfies the specification and enablement requirements. Some or all of the processes of the image processing method may be implemented by software and/or firmware and can be performed by the image processing device or its equivalent. A person having ordinary skill in the art can choose components or steps equivalent to those described in this specification to carry out the present invention, which means that the scope of this invention is not limited to the embodiments in the specification.

Figure 1:
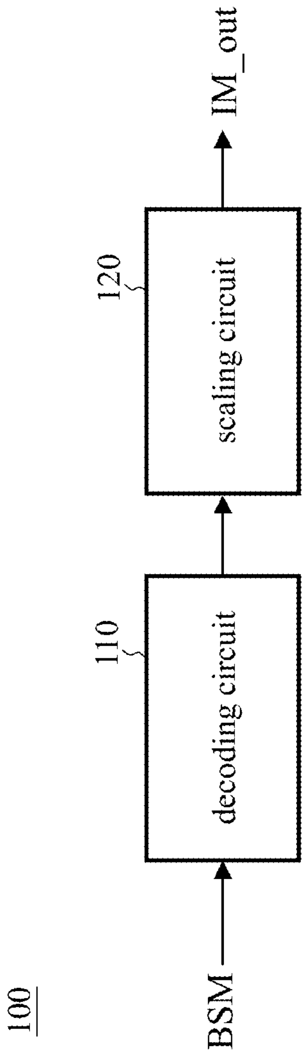
FIG. 1 (prior art)
FIG. 1 is a functional block diagram of a conventional electronic device.
Figure 2:
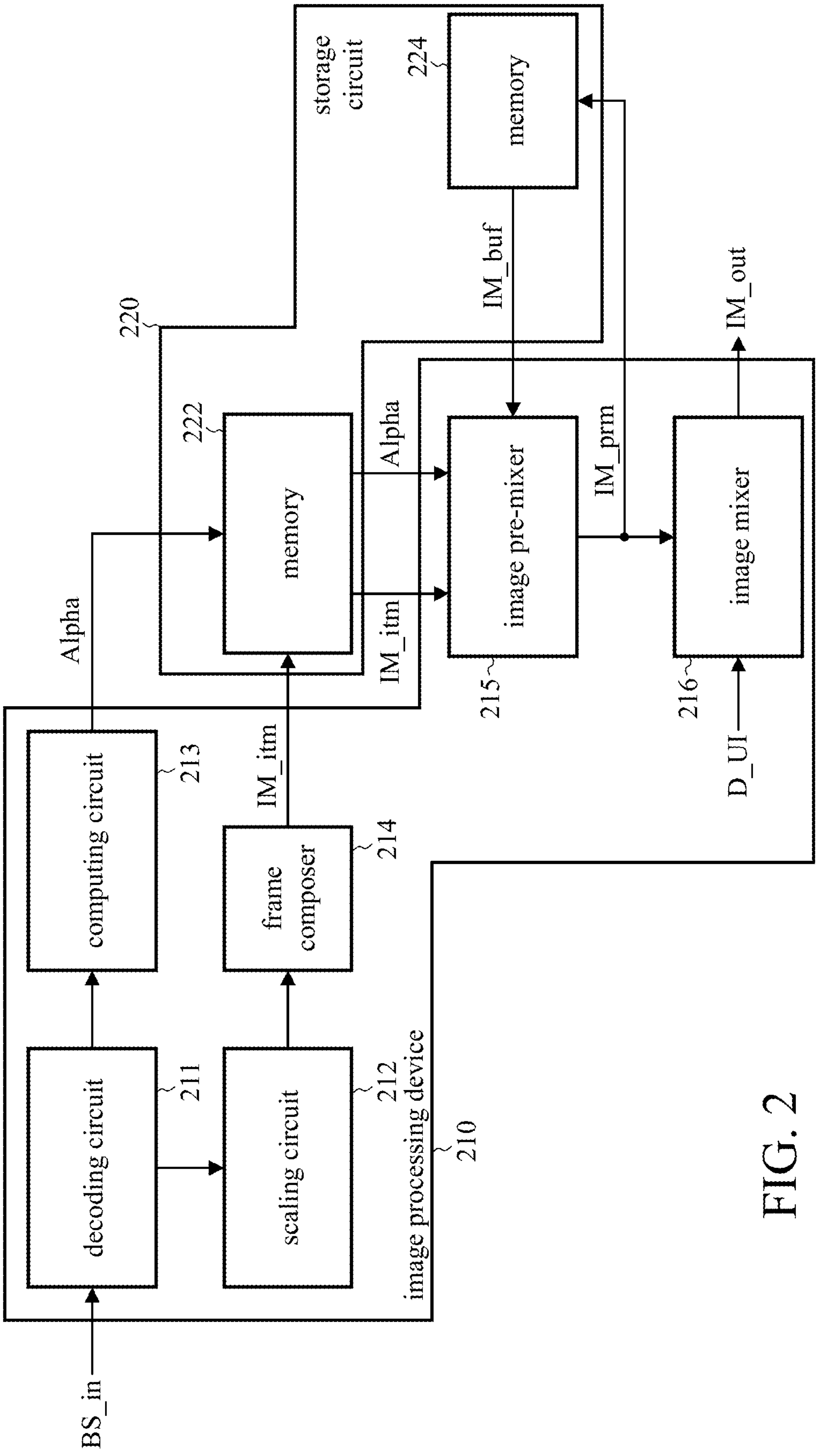
FIG. 2 is a functional block diagram of an image processing device according to an embodiment of the present invention.

FIG. 2 is a functional block diagram of an image processing device according to an embodiment of the present invention. The image processing device 210 is coupled to the storage circuit 220 and includes a decoding circuit 211, a scaling circuit 212, a computing circuit 213, a frame composer 214, an image pre-mixer 215, and an image mixer 216. The storage circuit 220 includes a memory 222 and a memory 224. The image processing device 210 receives the video data BS_in and generates an output image IM_out.

Figure 3:
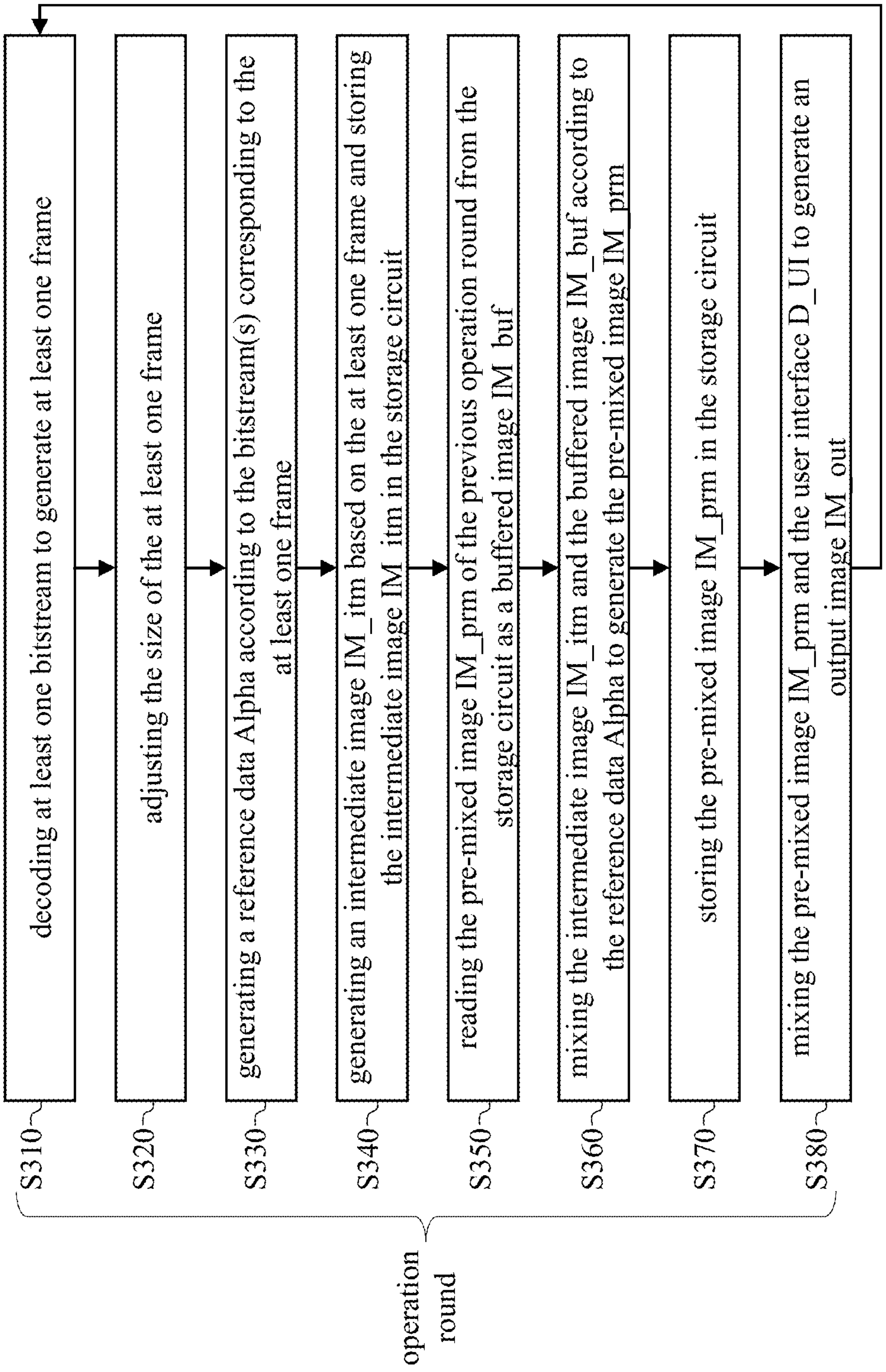
FIG. 3 is a flowchart of an image processing method according to an embodiment of the present invention.
Figure 4A:
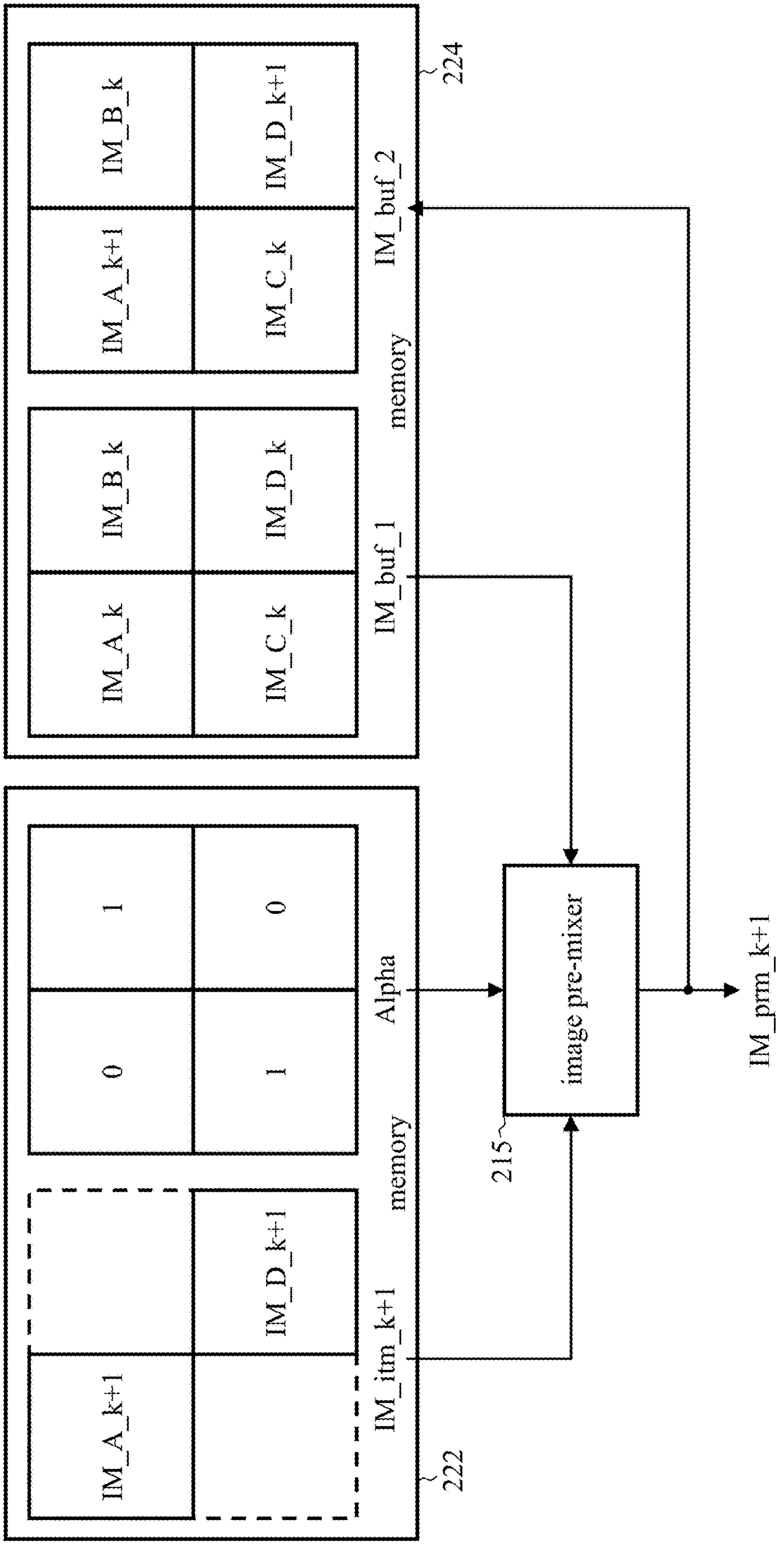
FIGS. 4A and 4B are schematic diagrams of several frames and images generated or processed by the image processing device according to an embodiment of the present invention.
Figure 4B:
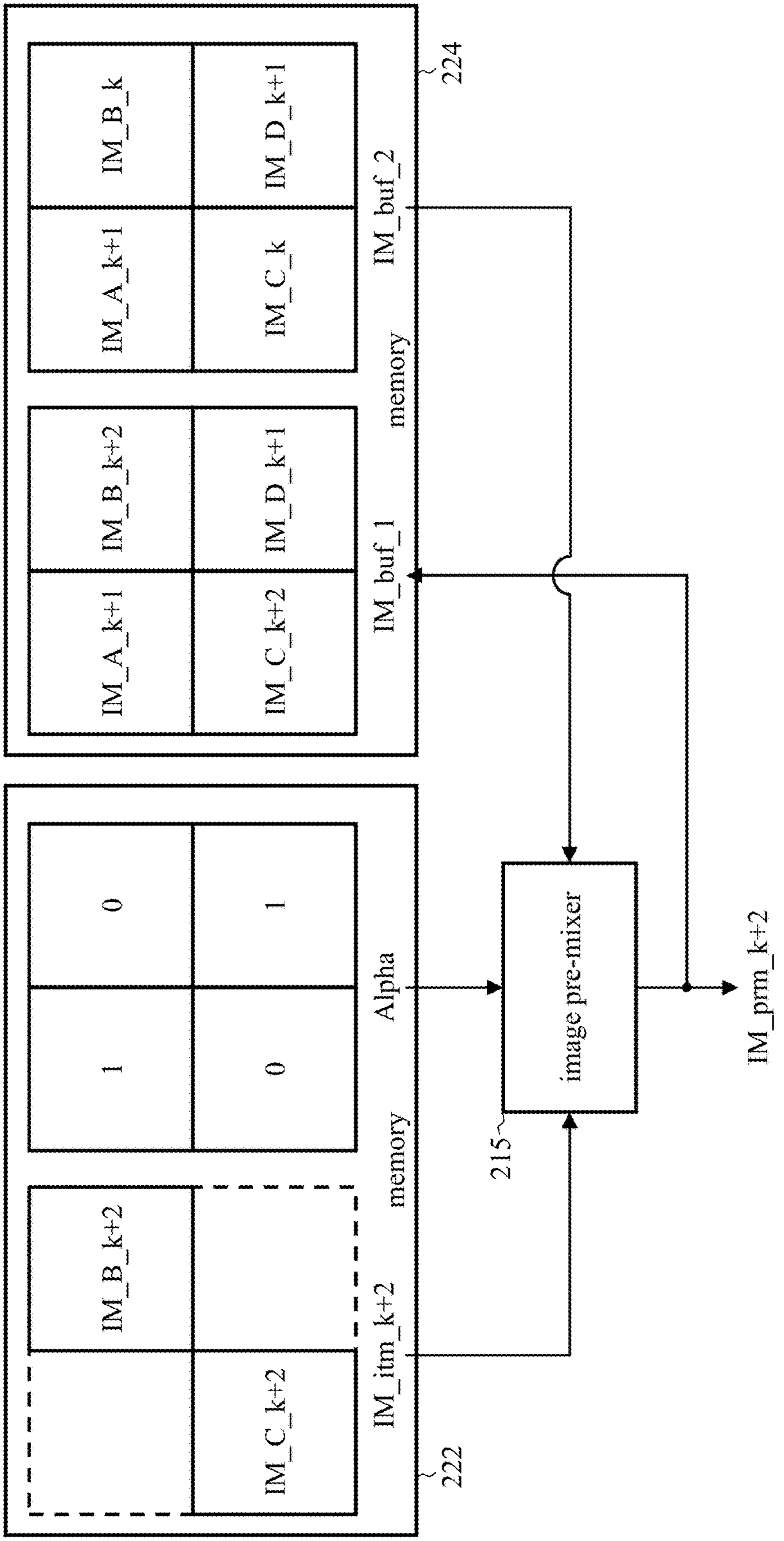

FIG. 3 is a flowchart of an image processing method according to an embodiment of the present invention. FIGS. 4A and 4B are schematic diagrams of several frames and images generated or processed by the image processing device according to an embodiment of the present invention. The video data BS_in processed by the image processing device 210 includes at least two bitstreams. In the embodiment shown in FIG. 4A and FIG. 4B, the video data BS_in includes four bitstreams (BS_A, BS_B, BS_C, and BS_D), and the frame rate (also referred to as the update rate) of at least one of the four bitstreams is different from the frame rate of the output image IM_out. In some embodiments, the output image IM_out is outputted to a display (not shown), and the frame rate of the output image IM_out is the frame rate of the display.

The image processing method in FIG. 3 includes multiple operation rounds, and one operation round includes steps S310-S380. FIGS. 4A and 4B correspond to the first operation round and the second operation round, respectively, and the first operation round and the second operation round are two consecutive operation rounds (the first operation round is before the second operation round). In the following discussion, before the first operation round, the image processing device 210 has completed at least one operation round, so the first buffered image IM_buf_1 in FIG. 4A is not empty, and the second buffered image IM_buf_2 is generated in the first operation round (step S370), which will be detailed below.

The image processing device and image processing method of the present invention are discussed below with reference to FIG. 2, FIG. 3, and FIGS. 4A-4B.

Step S310: The decoding circuit 211 decodes at least one bitstream of the video data BS_in to generate at least one frame. In the example shown in FIG. 4A (the first operation round), the bitstream BS_A and the bitstream BS_D have frames, while the bitstream BS_B and the bitstream BS_C have no frames. Therefore, the decoding circuit 211 decodes the bitstream BS_A and the bitstream BS_D in this step to generate the frame IM_A_k+1 and the frame IM_D_k+1, respectively. The dotted lines in the memory 222 in FIG. 4A indicate that the frame IM_B_k+1 and the frame IM_C_k+1 have no data. In other words, the bitstream BS_B and the bitstream BS_C have no data inputted to the image processing device 210 in the first operation round. Note that the decoding circuit 211 does not decode the bitstream BS_A and the bitstream BS_D at the same time.

Step S320: The scaling circuit 212 adjusts (enlarges or reduces) the size of the at least one frame. In the example of FIG. 4A, the scaling circuit 212 adjusts the sizes of the frame IM_A_k+1 and the frame IM_D_k+1 so that the frames meet the display requirements. Therefore, in the example of FIG. 4A, the frame IM_A_k+1 and the frame IM_D_k+1 in the memory 222 and the frame IM_A_k, the frame IM_B_k, the frame IM_C_k, and the frame IM_D_k in the memory 224 are adjusted frames. Note that in some embodiments, if there is no need to adjust the frame, the scaling circuit 212 and step S320 can be omitted.

Step S330: The computing circuit 213 generates a reference data Alpha according to the bitstream(s) corresponding to the at least one frame. More specifically, the computing circuit 213 determines the content of the reference data Alpha according to the frame(s) generated by the decoding circuit 211 in step S310. Taking FIG. 4A, because the decoding circuit 211 generates the frame IM_A_k+1 and the frame IM_D_k+1 in step S310, the decoding circuit 211 knows that in the first operation round, the bitstream BS_A and the bitstream BS_D have data while the bitstream BS_B and the bitstream BS_C do not; as a result, the reference data Alpha is set to (0,1,1,0) (where the four bits correspond to the bitstream BS_A, the bitstream BS_B, the bitstream BS_C, and the bitstream BS_D, respectively). Then, the computing circuit 213 stores the reference data Alpha in the storage circuit 220 (more specifically, in the memory 222).

Step S340: The frame composer 214 generates an intermediate image IM_itm based on the at least one frame and stores the intermediate image IM_itm in the storage circuit 220 (more specifically, in the memory 222). In the example of FIG. 4A, the frame composer 214 combines the frame IM_A_k+1 and the frame IM_D_k+1 to generate the intermediate image IM_itm_k+1 and stores the intermediate image IM_itm_k+1 in the storage circuit 220. Note that if the decoding circuit 211 generates only one frame (e.g., the frame IM_A_k+1) in a particular operation round, the intermediate image IM_itm of that operation round contains only that frame (e.g., in the intermediate image IM_itm, the positions corresponding to the frame IM_B_k+1, the frame IM_C_k+1, and the frame IM_D_k+1 are empty (no data)).

Step S350: The image pre-mixer 215 reads the previous pre-mixed image IM_prm (i.e., the pre-mixed image IM_prm_k generated in the previous operation round) from the storage circuit 220 (more specifically, from the memory 224) as a buffered image IM_buf. In the example of FIG. 4A, the pre-mixed image IM_prm_k is stored in the memory 224 in the previous operation round and becomes the first buffered image IM_buf_1. Therefore, the image pre-mixer 215 reads out the first buffered image IM_buf_1 from the memory 224 in this step (i.e., reads out the pre-mixed image IM_prm_k of the previous operation round).

Step S360: The image pre-mixer 215 mixes the intermediate image IM_itm and the buffered image IM_buf according to the reference data Alpha to generate the pre-mixed image IM_prm (more specifically, generate the pre-mixed image IM_prm_k+1). In the example of FIG. 4A, the buffered image IM_buf (i.e., the first buffered image IM_buf_1) includes the frame IM_A_k, the frame IM_B_k, the frame IM_C_k, and the frame IM_D_k that correspond to the bitstream BS_A, the bitstream BS_B, the bitstream BS_C, and the bitstream BS_D, respectively. Because the value of the reference data Alpha is (0,1,1,0) (where "O" indicates to take the frame from the intermediate image IM_itm_k+1, and "1" indicates to take the frame from the first buffered image IM_buf_1), the image pre-mixer 215 mixes the frame IM_A_k+1, the frame IM_B_k, the frame IM_C_k, and the frame IM_D_k+1 to generate the pre-mixed image IM_prm_k+1.

Step S370: The image pre-mixer 215 stores the pre-mixed image IM_prm (in the first operation round, the pre-mixed image IM_prm is the pre-mixed image IM_prm_k+1) in the memory 224. In other words, the image pre-mixer 215 generates the pre-mixed image IM_prm_k+1 in the first operation round, and the pre-mixed image IM_prm_k+1 will become the buffered image IM_buf (i.e., the second buffered image IM_buf_2) of the next operation round (i.e., the second operation round).

Step S380: The image mixer 216 mixes the pre-mixed image IM_prm and the user interface D_UI to generate an output image IM_out. In some embodiments, the user interface D_UI may be an on screen display (OSD). After step S380 finishes, the process returns to step S310 to proceed to the next operation round. In some embodiments, the frame rate of the pre-mixed image IM_prm is the same as the frame rate of the output image IM_out.

In the example of FIG. 4B (the second operation round), the decoding circuit 211 generates the frame IM_B_k+2 and the frame IM_C_k+2 in step S310, but does not generate the frame IM_A_k+2 and the frame IM_D_k+2 (i.e., in the second operation round, the bitstream BS_A and the bitstream BS_D have no frame). The decoding circuit 211 generates the reference data Alpha ((1,0,0,1)) in step S330, and then the frame composer 214 generates the intermediate image IM_itm_k+2 based on the frame IM_B_k+2 and the frame IM_C_k+2 in step S340. In step S350, the image pre-mixer 215 reads the pre-mixed image IM_prm_k+1 of the first operation round from the memory 224 as the buffered image IM_buf of the current operation round (i.e., the second buffered image IM_buf_2), and then in step S360, the image pre-mixer 215 mixes the intermediate image IM_itm_k+2 and the second buffered image IM_buf_2 according to the reference data Alpha to generate the pre-mixed image IM_prm_k+2. Next, in step S370, the image pre-mixer 215 stores the pre-mixed image IM_prm_k+2 (which becomes the first buffered image IM_buf_1) in the memory 224. In step S380, the image mixer 216 mixes the pre-mixed image IM_prm_k+2 and the user interface D_UI to generate the output image IM_out.

In some embodiments, if there is no user interface D_UI, the image mixer 216 can be omitted, and the image processing device 210 directly outputs the pre-mixed image IM_prm to the display.

It can be seen from FIG. 4A and FIG. 4B that the memory 224 is used as a ping-pong buffer. That is, the two memory blocks of the memory 224 (i.e., the block that stores the first buffered image IM_buf_1 and the block that stores the second buffered image IM_buf_2) are read and written, respectively, in the first operation round and written and read, respectively, in the second operation round.

Figure 5:
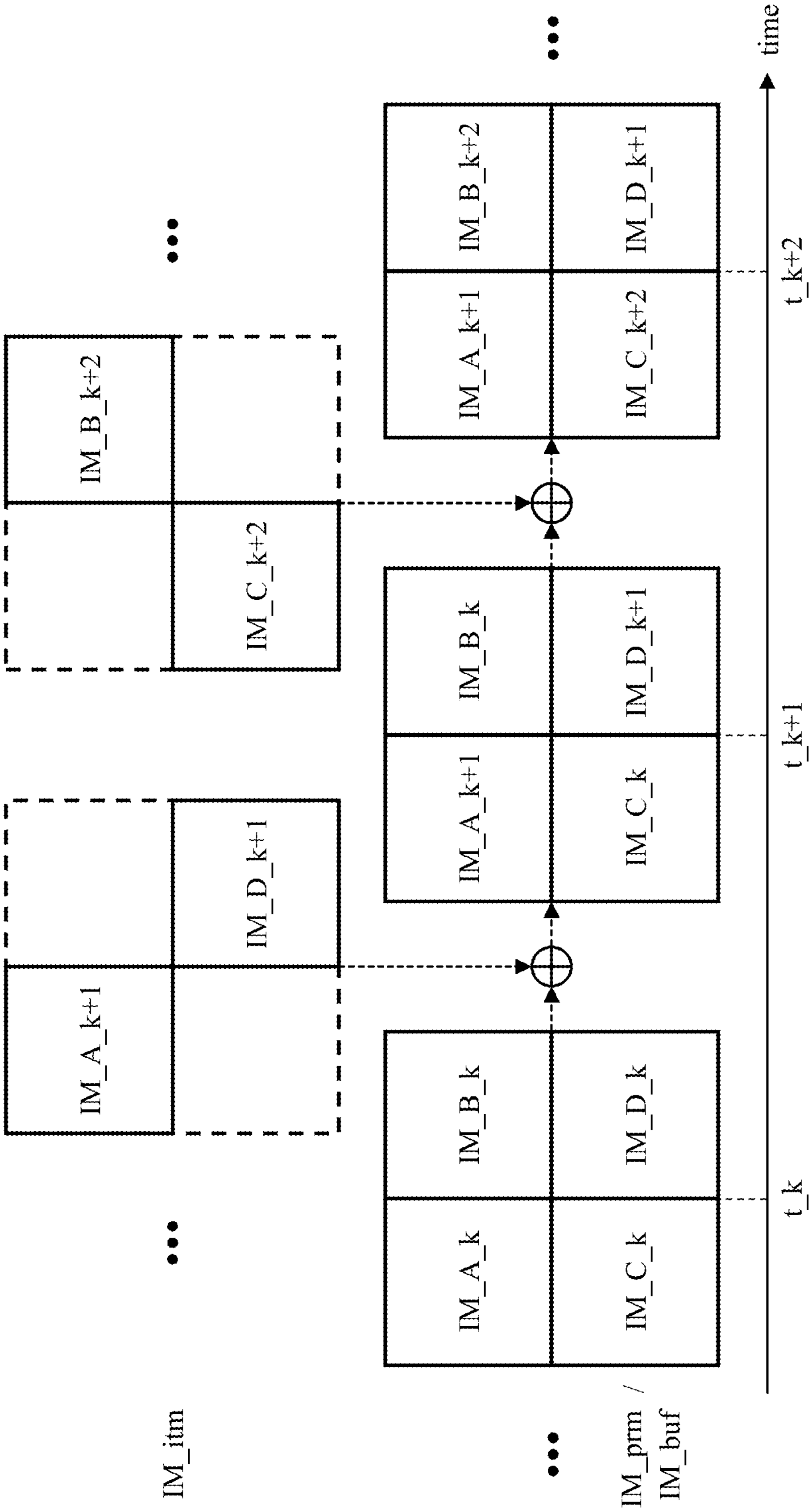
FIG. 5 is a schematic diagram of the timing of several images.

FIG. 5 is a schematic diagram showing the timing of several images. The pre-mixed image IM_prm_k, the pre-mixed image IM_prm_k+1, and the pre-mixed image IM_prm_k+2 are generated at the time point t_k, the time point t_k+1, and the time point t_k+2, respectively. The time point t_k+1 and the time point t_k+2 correspond to the first operation round and the second operation round, respectively. The period of the operation rounds (i.e., the difference between the time point t_k+2 and the time point t_k+1, and the difference between the time point t_k+1 and the time point t_k) is the reciprocal of the frame rate of the output image IM_out.

Figure 6:
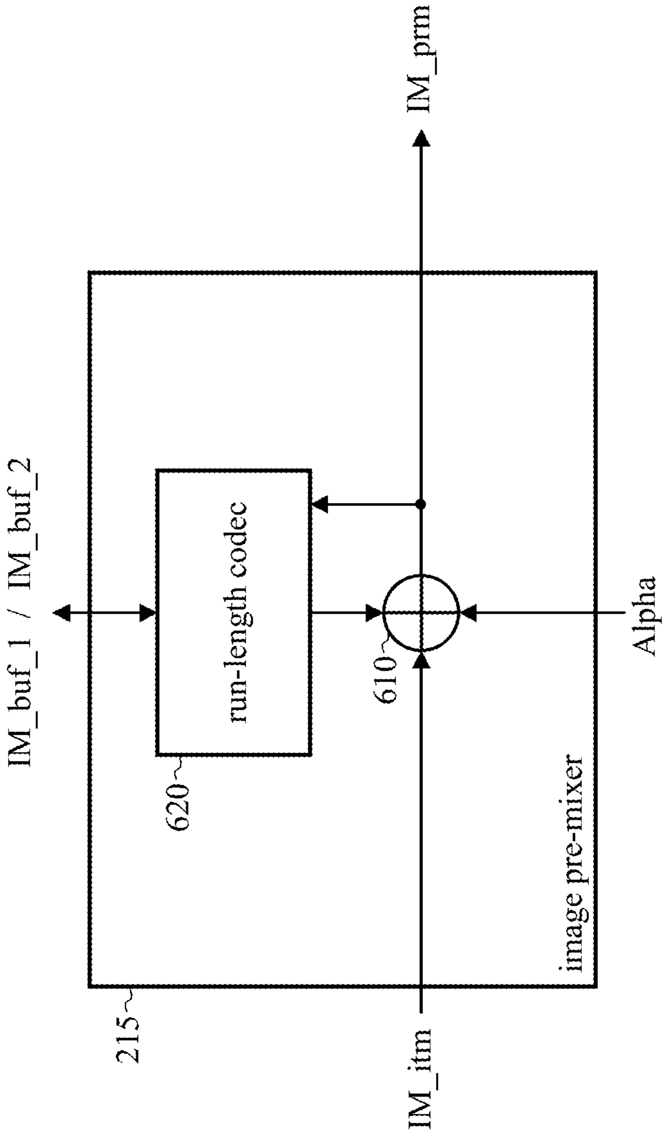
FIG. 6 is a functional block diagram of an image pre-mixer according to an embodiment of the present invention.

FIG. 6 is a functional block diagram of the image pre-mixer 215 according to an embodiment of the present invention. The image pre-mixer 215 includes an image combination circuit 610 and a run-length codec 620. Before storing the pre-mixed image IM_prm in the memory 224, the image pre-mixer 215 uses the run-length codec 620 to encode the pre-mixed image IM_prm to reduce the amount of data (i.e., to reduce the use of the memory 224), and when reading the buffered image IM_buf from the memory 224, the image pre-mixer 215 first uses the run-length codec 620 to decode the buffered image IM_buf. Therefore, the run-length codec 620 can reduce the cost of the image processing device 210 (because a smaller memory 224 is used). Run-length coding and decoding are well known to people having ordinary skill in the art, so the details are thus omitted for brevity.

Figure 7:
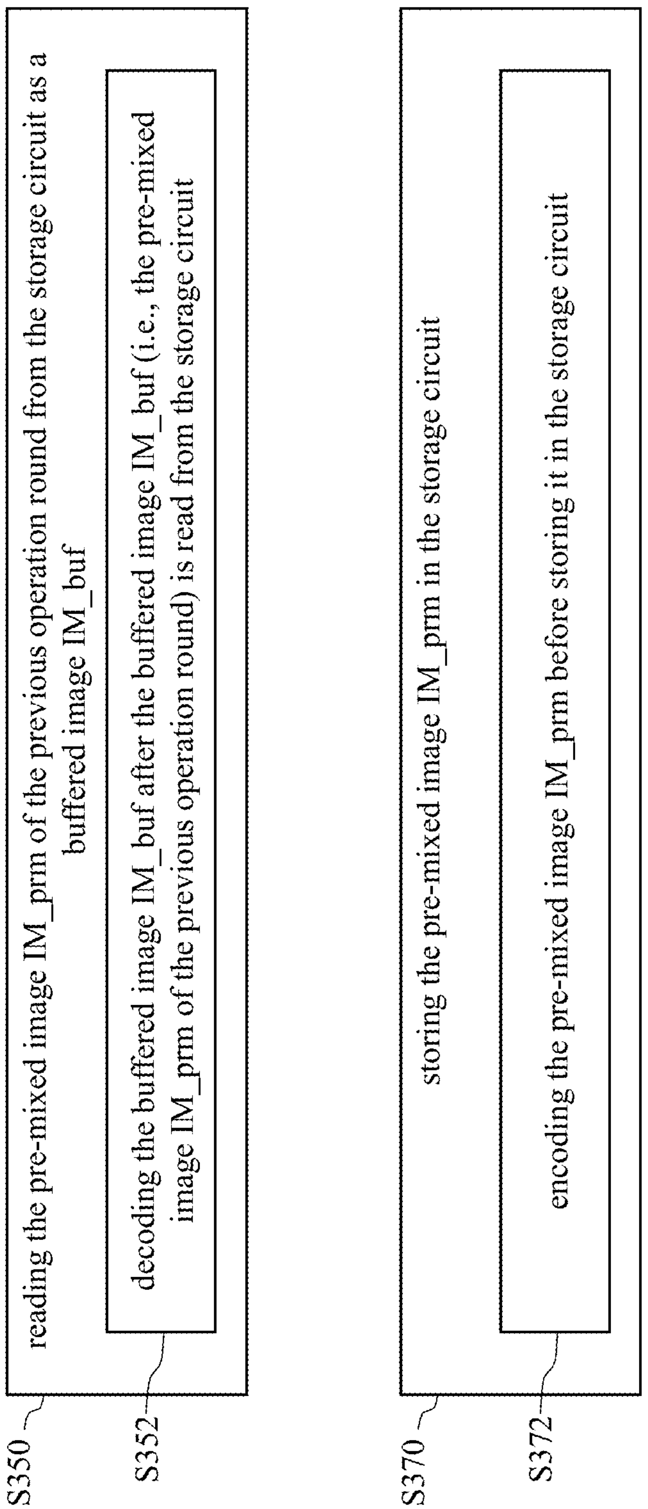
FIG. 7 shows the sub-steps of step S350 and step S370 in FIG. 3.

Corresponding to the embodiment in FIG. 6, step S350 and step S370 in FIG. 3 include sub-step S352 and sub-step S372, respectively. Reference is made to FIG. 7, which shows the sub-steps of step S350 and step S370 in FIG. 3. In sub-step S352, after reading the buffered image IM_buf (i.e., the pre-mixed image IM_prm of the previous operation round) from the storage circuit 220, the image pre-mixer 215 uses the run-length codec 620 to decode the buffered image IM_buf. In sub-step S372, the image pre-mixer 215 uses the run-length codec 620 to encode the pre-mixed image IM_prm before storing it in the storage circuit 220.

In other embodiments, the reference data Alpha may be arranged in one of the channels of the intermediate image IM_itm. For example, in addition to the color and/or luminance channels (e.g., YUV or RGB), the intermediate image IM_itm further includes a fourth channel that represents the reference data Alpha.

The computing circuit 213 can be a circuit or electronic component with program execution capability, such as a central processing unit (CPU), a microprocessor, a microcontroller, a micro-processing unit, a digital signal processor (DSP), or its equivalent circuit. The computing circuit 213 performs its functions (including but not limited to generating the reference data Alpha) by executing the program codes and/or program instructions stored in the memory (e.g., the memory 222). In other embodiments, people having ordinary skill in the art can design the computing circuit 213 according to the above disclosure, that is, the computing circuit 213 can be an application specific integrated circuit (ASIC) or can be embodied by circuitry or hardware such as a programmable logic device (PLD).

In summary, since the storage circuit 220 stores the pre-mixed image IM_prm of the previous operation round, the image processing device 210 can reduce the workload of the current operation round (including but not limited to reading the previous frame from the memory to perform the scaling operation and/or the combination operation) by reading the pre-mixed image IM_prm of the previous operation round in the current operation round. Therefore, the image processing device 210 can operate at a lower frequency, and the memory bandwidth requirement can be reduced.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The four bitstreams are intended to illustrate the invention by way of example and not to limit the scope of the claimed invention. People having ordinary skill in the art may apply the present invention to two, three, or more bitstreams in accordance with the foregoing discussions.

Since a person having ordinary skill in the art can appreciate the implementation detail and the modification thereto of the present method invention through the disclosure of the device invention, repeated and redundant description is thus omitted. Note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An image processing device, wherein the image processing device is coupled to a storage circuit and configured to receive a video data, and the video data comprises a first bitstream and a second bitstream, the image processing device comprising:

a decoding circuit configured to decode the first bitstream to generate a first frame;

a computing circuit coupled to the decoding circuit and configured to generate a reference data;

a frame composer coupled to the decoding circuit and configured to generate an intermediate image based on at least the first frame and to store the intermediate image in the storage circuit; and an image pre-mixer coupled to the storage circuit and configured to mix the intermediate image and a buffered image according to the reference data to generate a pre-mixed image, wherein the buffered image includes a second frame corresponding to the second bitstream;

wherein the buffered image has already been stored in the storage circuit before the first frame is generated;

wherein one operation round comprises decoding the video data and generating the intermediate image and the pre-mixed image, and the computing circuit generates the reference data according to whether the decoding circuit generates a frame of the first bitstream in an operation round and whether the decoding circuit generates a frame of the second bitstream in the operation round.

2. The image processing device of claim 1, wherein the buffered image further comprises a third frame corresponding to the first bitstream, when the reference data indicates that the intermediate image does not comprise a frame corresponding to the second bitstream, the image pre-mixer generates the pre-mixed image based on at least the first frame and the second frame, so that the pre-mixed image comprises the first frame and the second frame but does not comprise the third frame.

3. The image processing device of claim 1, wherein one operation round comprises decoding the video data and generating the intermediate image and the pre-mixed image, and the image pre-mixer further stores the pre-mixed image in the storage circuit and in a next operation round reads the pre-mixed image from the storage circuit as the buffered image.

4. The image processing device of claim 3, wherein the image pre-mixer comprises a run-length codec configured to encode the pre-mixed image before storing the pre-mixed image in the storage circuit and to decode the buffered image.

5. The image processing device of claim 1 further comprising:

a scaling circuit coupled to the decoding circuit and configured to adjust a size of the first frame;

wherein the second frame contained in the buffered image is a frame adjusted by the scaling circuit.

6. The image processing device of claim 1, wherein a frame rate of the first bitstream is different from a frame rate of the pre-mixed image.

7. An image processing method for processing a video data, wherein the video data comprises a first bitstream and a second bitstream, the method comprising:

decoding the first bitstream to generate a first frame;

generating an intermediate image based on at least the first frame;

storing the intermediate image in a storage circuit; and mixing the intermediate image and a buffered image according to a reference data to generate a pre-mixed image;

wherein the buffered image includes a second frame and a third frame, the second frame corresponds to the second bitstream, and the third frame corresponds to the first bitstream;

wherein before the first frame is generated, the buffered image has already been stored in the storage circuit;

the third frame is before the first frame, and when the reference data indicates that the intermediate image does not comprise a frame corresponding to the second bitstream, the pre-mixed image comprises the first frame and the second frame but does not comprise the third frame.

8. The method of claim 7, wherein one operation round comprises decoding the video data and generating the intermediate image and the pre-mixed image, the method further comprising:

generating the reference data according to whether a frame of the first bitstream is generated in an operation round and whether a frame of the second bitstream is generated in the operation round.

9. The method of claim 7, wherein one operation round comprises decoding the video data and generating the intermediate image and the pre-mixed image, the method further comprising:

storing the pre-mixed image in the storage circuit and in a next operation round reading the pre-mixed image from the storage circuit as the buffered image.

10. The method of claim 9 further comprising:

encoding the pre-mixed image before storing the pre-mixed image in the storage circuit; and decoding the buffered image.

11. The method of claim 7 further comprising:

adjusting a size of the first frame;

wherein the second frame and the third frame contained in the buffered image are frames that have been resized.

12. The method of claim 7, wherein a frame rate of the first bitstream is different from a frame rate of the pre-mixed image.

13. An image processing device, wherein the image processing device is coupled to a storage circuit and configured to receive a video data, and the video data comprises a first bitstream and a second bitstream, the image processing device comprising:

a decoding circuit configured to decode the first bitstream to generate a first frame;

a computing circuit coupled to the decoding circuit and configured to generate a reference data;

a frame composer coupled to the decoding circuit and configured to generate an intermediate image based on at least the first frame and to store the intermediate image in the storage circuit; and an image pre-mixer coupled to the storage circuit and configured to mix the intermediate image and a buffered image according to the reference data to generate a pre-mixed image, wherein the buffered image includes a second frame corresponding to the second bitstream;

wherein the buffered image has already been stored in the storage circuit before the first frame is generated;

wherein one operation round comprises decoding the video data and generating the intermediate image and the pre-mixed image, and the image pre-mixer further stores the pre-mixed image in the storage circuit and in a next operation round reads the pre-mixed image from the storage circuit as the buffered image.

14. The image processing device of claim 13, wherein the image pre-mixer comprises a run-length codec configured to encode the pre-mixed image before storing the pre-mixed image in the storage circuit and to decode the buffered image.

* * * * *